United States Patent
Kaneko

(10) Patent No.: US 12,456,133 B2
(45) Date of Patent: Oct. 28, 2025

(54) DISPLAY CONTROL DEVICE, DISPLAY CONTROL METHOD, AND PROGRAM

(71) Applicant: Sharp NEC Display Solutions, Ltd., Tokyo (JP)

(72) Inventor: Yasunobu Kaneko, Tokyo (JP)

(73) Assignee: Sharp NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 18/394,535

(22) Filed: Dec. 22, 2023

(65) Prior Publication Data
US 2024/0135411 A1    Apr. 25, 2024

Related U.S. Application Data

(63) Continuation of application No. PCT/JP2021/030098, filed on Aug. 18, 2021.

(51) Int. Cl.
*G06Q 30/0251* (2023.01)
*G06F 3/01* (2006.01)
(Continued)

(52) U.S. Cl.
CPC ......... *G06Q 30/0269* (2013.01); *G06F 3/011* (2013.01); *G06F 3/0482* (2013.01); *G06V 20/50* (2022.01); *G06V 40/10* (2022.01)

(58) Field of Classification Search
CPC ....... G06F 3/011; G06F 3/0482; G06V 20/50; G06V 40/10; G06Q 30/06; G06Q 30/02
See application file for complete search history.

(56) References Cited

U.S. PATENT DOCUMENTS

| 2013/0328765 A1 | 12/2013 | Kawamoto |
| 2018/0232799 A1 | 8/2018 | Kitagawa et al. |

(Continued)

FOREIGN PATENT DOCUMENTS

| JP | 5768010 B | 8/2015 |
| JP | 2016-062390 A | 4/2016 |

(Continued)

OTHER PUBLICATIONS

International Search Report in PCT/JP2021/030098 dated Nov. 16, 2021 with English translation thereof.

*Primary Examiner* — Christopher E Leiby
(74) *Attorney, Agent, or Firm* — McGinn I.P.Law Group, PLLC

(57) ABSTRACT

A display control device includes: an attribute information acquiring unit configured to acquire first attribute information indicating attributes of a person who is operating an operation terminal displaying commodity information in response to an operation on the basis of a first image obtained by imaging the person using a first imaging device provided in the operation terminal and to acquire second attribute information indicating attributes of a person included in a second image captured by a second imaging device provided in a display device different from the operation terminal on the basis of the second image; an operation information acquiring unit configured to acquire operation information indicating the commodity information displayed on the operation terminal from the operation terminal; a content selecting unit configured to select content on the basis of the acquired first attribute information, the acquired second attribute information, and the acquired operation information; and a display control unit configured to display the selected content on the display device.

14 Claims, 13 Drawing Sheets

(51) Int. Cl.
   *G06F 3/0482*    (2013.01)
   *G06V 20/50*     (2022.01)
   *G06V 40/10*     (2022.01)

(56) References Cited

U.S. PATENT DOCUMENTS

| | | | |
|---|---|---|---|
| 2020/0088463 A1* | 3/2020 | Jeong | G06F 3/167 |
| 2021/0256267 A1* | 8/2021 | Ranasinghe | G01S 11/12 |
| 2022/0005072 A1* | 1/2022 | Chhipa | G06Q 30/0255 |
| 2023/0230112 A1* | 7/2023 | Terayoko | G06Q 30/0238 |
| | | | 705/7.29 |
| 2023/0298223 A1* | 9/2023 | Odan | G06F 3/011 |
| | | | 345/156 |

FOREIGN PATENT DOCUMENTS

| | | |
|---|---|---|
| JP | 2016-095837 A | 5/2016 |
| JP | 2019-159468 A | 9/2019 |
| WO | WO 2017/030177 A1 | 2/2017 |
| WO | WO 2020/195614 A1 | 10/2020 |

\* cited by examiner

FIG. 9

| | ATTRIBUTE INFORMATION | | | | | |
|---|---|---|---|---|---|---|
| | SEX | AGE | HAIR COLOR | DRESS | DRESS COLOR (TOP) | DRESS COLOR (BOTTOM) |
| CUSTOMER III | MALE | PERSON IN TWENTIES | BLACK | TROUSERS | YELLOW | BLACK |
| CUSTOMER JJJ | MALE | PERSON IN THIRTIES | BLACK | TROUSERS | RED | BLUE |
| CUSTOMER KKK | FEMALE | PERSON IN TWENTIES | BROWN | SKIRT | WHITE | BLACK |
| CUSTOMER LLL | MALE | PERSON IN FORTIES | BLOND | TROUSERS | BLUE | BLUE |

FIG. 10

| ATTRIBUTE MMM | COMMODITY AAA | COMMODITY BBB | COMMODITY CCC | COMMODITY DDD | ADVERTISEMENT EEE | ADVERTISEMENT FFF | ADVERTISEMENT GGG | ADVERTISEMENT HHH |
|---|---|---|---|---|---|---|---|---|
| | 0 | 0 | 1 | 0 | 0 | 0 | 0 | 1 |

NUMBER OF SELECTIONS

FIG. 11

| | COMMODITY AAA | COMMODITY BBB | COMMODITY CCC | COMMODITY DDD | ADVERTISEMENT EEE | ADVERTISEMENT FFF | ADVERTISEMENT GGG | ADVERTISEMENT HHH |
|---|---|---|---|---|---|---|---|---|
| ATTRIBUTE MMM | 100 | 50 | 30 | 20 | 80 | 60 | 30 | 100 |
| ATTRIBUTE NNN | 40 | 100 | 120 | 200 | 40 | 10 | 100 | 30 |
| ATTRIBUTE OOO | 30 | 120 | 100 | 10 | 100 | 78 | 30 | 10 |
| ATTRIBUTE PPP | 120 | 40 | 200 | 50 | 10 | 120 | 80 | 30 |
| ATTRIBUTE QQQ | 10 | 100 | 40 | 20 | 90 | 100 | 30 | 25 |
| ... | ... | ... | ... | ... | ... | ... | ... | ... |

FIG. 12

| | 9:00~10:00 | 10:00~11:00 | 11:00~12:00 | 12:00~13:00 | 13:00~14:00 | 14:00~15:00 | 15:00~16:00 | ... |
|---|---|---|---|---|---|---|---|---|
| ATTRIBUTE MMM | 90 | 40 | 20 | 10 | 70 | 50 | 20 | ⋮ |
| ATTRIBUTE NNN | 30 | 90 | 110 | 190 | 30 | 5 | 90 | ⋮ |
| ATTRIBUTE OOO | 20 | 110 | 90 | 5 | 90 | 68 | 20 | ⋮ |
| ATTRIBUTE PPP | 110 | 30 | 190 | 40 | 5 | 110 | 70 | ⋮ |
| ATTRIBUTE QQQ | 5 | 90 | 30 | 10 | 80 | 90 | 20 | ⋮ |
| ⋮ | ⋮ | ⋮ | ⋮ | ⋮ | ⋮ | ⋮ | ⋮ | ... |

DISPLAY CONTROL DEVICE, DISPLAY CONTROL METHOD, AND PROGRAM

TECHNICAL FIELD

The present invention relates to a display control device, a display control method, and a program.

BACKGROUND ART

In the related art, various techniques of detecting a person near a display device such as a digital signage displaying contents such as advertisements and displaying contents corresponding to the detected person on the display device have been proposed.

For example, in Patent Document 1, a technique of identifying a target customer from an image captured by an imaging device which is provided to correspond to each display device in a store and displaying an advertisement corresponding to a commodity purchase result of the identified customer on the display device is disclosed. With this technique, it is possible to display an advertisement corresponding to a commodity in which the customer was interested in the past on the display device on the basis of the commodity purchase result.

CITATION LIST

Patent Document

Patent Document 1

Japanese Patent No. 5768010

SUMMARY OF INVENTION

Technical Problem

However, since the advertisement displayed on the display device in the technique disclosed in Patent Document 1 is displayed on the basis of the commodity purchase result, the advertisement is an advertisement of a commodity in which the customer was interested when the customer purchased a commodity in the past. Accordingly, the advertisement displayed on the display device in the technique cannot be said to be an advertisement of a commodity in which the customer visiting the store at this time is interested.

In consideration of the aforementioned circumstances, an objective of the present invention is to provide a display control device, a display control method, and a program that can display contents of a commodity in which a customer visiting a store at this time is interested.

Solution to Problem

In order to achieve the aforementioned objective, according to an aspect of the present invention, there is provided a display control device including: an attribute information acquiring unit configured to acquire first attribute information indicating attributes of a person who is operating an operation terminal displaying commodity information in response to an operation on the basis of a first image obtained by imaging the person using a first imaging device provided in the operation terminal and to acquire second attribute information indicating attributes of a person included in a second image captured by a second imaging device provided in a display device different from the operation terminal on the basis of the second image: an operation information acquiring unit configured to acquire operation information indicating the commodity information displayed on the operation terminal from the operation terminal; a content selecting unit configured to select content on the basis of the acquired first attribute information, the acquired second attribute information, and the acquired operation information; and a display control unit configured to display the selected content on the display device.

According to another aspect of the present invention, there is provided a display control method including: an attribute information acquiring step of causing an attribute information acquiring unit to acquire first attribute information indicating attributes of a person who is operating an operation terminal displaying commodity information in response to an operation on the basis of a first image obtained by imaging the person using a first imaging device provided in the operation terminal and to acquire second attribute information indicating attributes of a person included in a second image captured by a second imaging device provided in a display device different from the operation terminal on the basis of the second image: an operation information acquiring step of causing an operation information acquiring unit to acquire operation information indicating the commodity information displayed on the operation terminal from the operation terminal; a content selecting step of causing a content selecting unit to select content on the basis of the acquired first attribute information, the acquired second attribute information, and the acquired operation information; and a display control step of causing a display control unit to display the selected content on the display device.

According to another aspect of the present invention, there is provided a program causing a computer to serve as: an attribute information acquiring means configured to acquire first attribute information indicating attributes of a person who is operating an operation terminal displaying commodity information in response to an operation on the basis of a first image obtained by imaging the person using a first imaging device provided in the operation terminal and to acquire second attribute information indicating attributes of a person included in a second image captured by a second imaging device provided in a display device different from the operation terminal on the basis of the second image: an operation information acquiring means configured to acquire operation information indicating the commodity information displayed on the operation terminal from the operation terminal; a content selecting means configured to select content on the basis of the acquired first attribute information, the acquired second attribute information, and the acquired operation information; and a display control means configured to display the selected content on the display device.

Advantageous Effects of Invention

According to the present invention, it is possible to display contents of a commodity in which a customer visiting a store in this time is interested.

BRIEF DESCRIPTION OF DRAWINGS

FIG. 9 is a diagram illustrating an example of a data structure of attribute information according to the embodiment.

FIG. 10 is a diagram illustrating an example of a data structure of operation information according to the embodiment.

FIG. 11 is a diagram illustrating an example of a data structure of counting information according to the embodiment.

FIG. 12 is a diagram illustrating an example of a data structure of time-specific information according to the embodiment.

DESCRIPTION OF EMBODIMENTS

Hereinafter, an embodiment of the present invention will be described in detail with reference to the accompanying drawings.

<1. Schematic Configuration of Display System>

Figure 1:
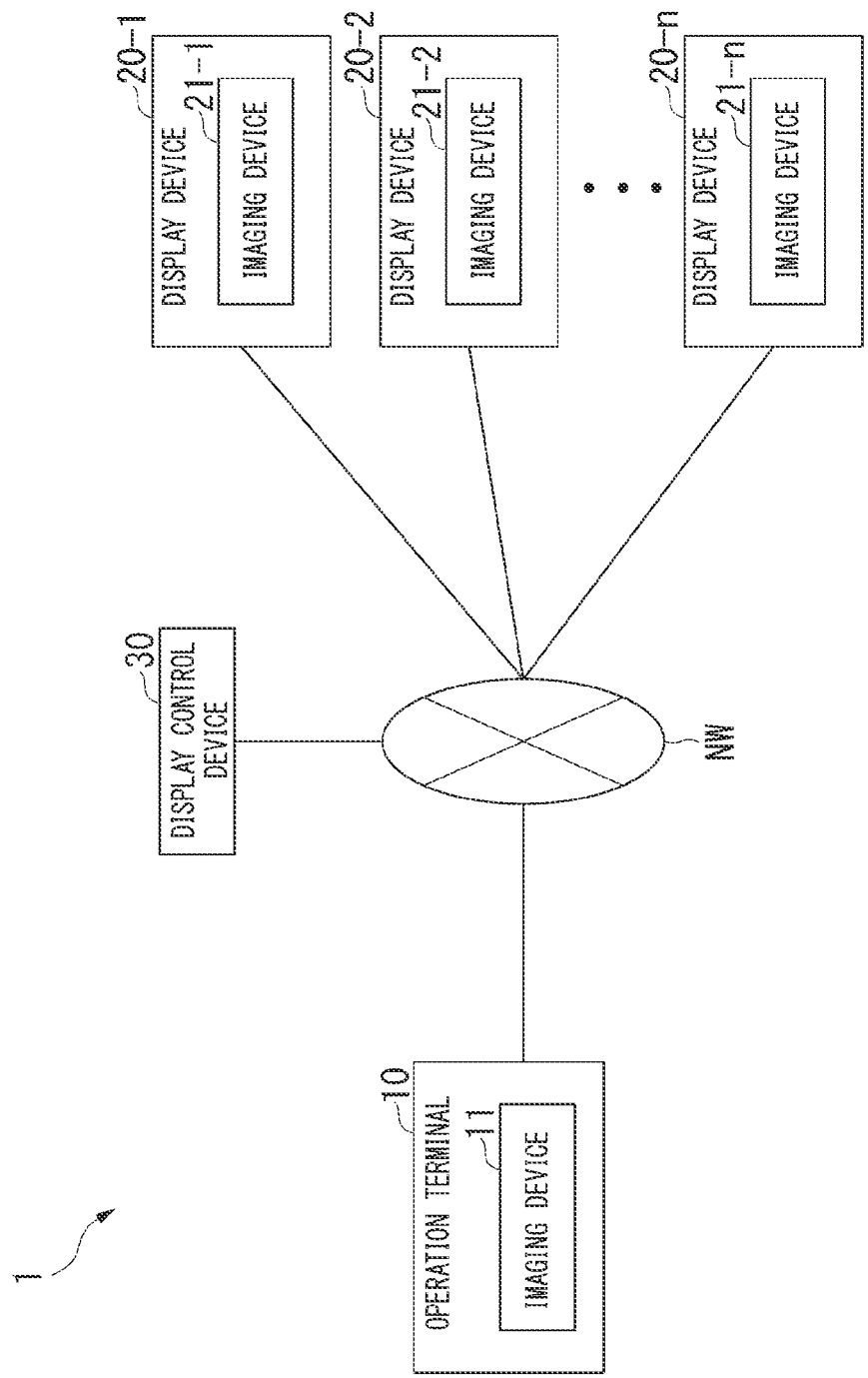
FIG. 1 is a diagram schematically illustrating an example of a configuration of a display system according to an embodiment.

First, a schematic configuration of a display system according to the embodiment will be described below with reference to FIGS. 1 and 2. FIG. 1 is a diagram illustrating an example of a schematic configuration of the display system according to the embodiment.

The display system 1 illustrated in FIG. 1 includes an operation terminal 10, display devices 20-1 to 20-n (where n is a natural number), and a display control device 30.

The display control device 30 is communicatively connected to the operation terminal 10 and the display devices 20 via a network NW. Communication between the operation terminal 10 and the display control device 30 and communication between the display devices 20 and the display control device 30 may be one of wired communication and wireless communication.

(1) Operation Terminal 10

The operation terminal 10 is a terminal that displays commodity information on commodities according to an operation. The operation is, for example, an operation that is performed by a person visiting a store (hereinafter also referred to as a "customer"). A customer operates the operation terminal 10 to acquire commodity information on commodities. For example, by operating the operation terminal 10, the customer can acquire commodity information on at least commodities interesting the customer such as commodities which are scheduled to be purchased in this visit or commodities which are not scheduled to be performed but in which the customer is interested.

The commodity information includes position information indicating an area or a position at which commodities are displayed, detailed information indicating details of commodities, and advertisement information indicating advertisements of commodities. An area in which commodities are displayed is determined, for example, according to classifications of the commodities. The detailed information includes, for example, images, prices, manufacturers, explanation, and classifications of commodities.

The operation terminal 10 displays position information, detailed information, advertisement information, and the like of commodities according to a customer's operation. For example, the operation terminal 10 has a function of displaying a floor map of the store. When a customer performs a floor map display operation, the operation terminal 10 displays an area in which commodities are displayed on the floor map.

The operation terminal 10 has a function of searching for commodities. When a customer performs a commodity searching operation, the operation terminal 10 displays a list of corresponding commodities on the basis of a search keyword input by the customer. When the customer performs a selecting operation of selecting one commodity out of the commodities in a list, the operation terminal 10 displays detailed information of the selected commodity.

The operation terminal 10 has a function of displaying an advertisement. For example, the operation terminal 10 displays an outline of an advertisement on a menu screen, a screen for displaying a floor map, a list of detailed information, a screen for displaying detailed information, or the like. When the customer performs a selecting operation of selecting an outline of an advertisement, the operation terminal 10 displays details of the selected advertisement.

The operation terminal 10 also serves to collect information from customers in addition to serving to provide commodity information to the customers. For example, the operation terminal 10 has a function of collecting operation information indicating operation details of the operation terminal 10 by a customer. The operation information includes, for example, information indicating operation histories indicating operation details of customers having operated the operation terminal 10, commodity information on commodities which customers operated the operation terminal 10 to display, and the like.

The operation terminal 10 has a function of collecting attribute information indicating attributes of a customer who is operating the operation terminal 10. The attribute information includes, for example, information such as sex, age, hair color, dress, dress color (top and bottom) of a customer. The operation terminal 10 according to this embodiment includes an imaging device 11 (for example, a camera) as illustrated in FIG. 1. The imaging device 11 is provided to capture an image (a still image or a moving image) of a customer who is operating the operation terminal 10. In this embodiment, attributes of a customer who is operating the operation terminal 10 are extracted from an image of the customer (hereinafter also referred to as a "customer image") imaged by the imaging device 11 when the customer is operating the operation terminal 10.

The imaging device 11 is an example of a first imaging device. The customer image is an example of a first image. Attribute information indicating attributes of a customer who is operating the operation terminal 10 which are extracted from the customer image is an example of first attribute information.

The imaging device 11 may be incorporated into the operation terminal 10 or may be connected to the outside thereof. The imaging device 11 may be provided at an arbitrary position as long as it can image a customer who is operating the operation terminal 10. For example, the imaging device 11 may be provided on a ceiling, a wall, a pillar, a floor, or the like of the store. It is preferable that the imaging device 11 be provided at a position at which the whole body of a customer can be more clearly imaged from the front side. Accordingly, it is possible to more accurately acquire more attribute information of a customer.

When the imaging device 11 is provided outside of the operation terminal 10, the imaging device 11 may not be connected to the operation terminal 10 but may be communicatively connected directly to the display control device 30.

The operation terminal 10 may be provided at an arbitrary position inside or outside of the store as long as it is a position within the site of the store. For example, it is preferable that the operation terminal 10 be provided at a position at which it can be operated by more customers to collect information of more customers. For example, the operation terminal 10 can be provided in the vicinity of an entrance at which it can be easily seen by visiting customers. There is a high likelihood that a visiting customer will first search for a place at which a target commodity (an interesting commodity) is located using a floor map or the like. Accordingly, it is possible to enhance the probability of operation of the operation terminal 10 by providing the operation terminal 10 in the vicinity of the entrance.

(2) Display Devices 20-1 to 20-*n*

The display devices 20-1 to 20-*n* are display devices that display content associated with commodities. The display devices 20-1 to 20-*n* are devices that are different from the operation terminal 10. The content is, for example, an image (a still image or a moving image) indicating an advertisement or the like. That is, the display devices 20-1 to 20-*n* serve as a digital signage. For example, the display devices 20-1 to 20-*n* may be provided on a wall or pillar of the store or may be provided at an arbitrary position using a stand or the like.

The display devices 20-1 to 20-*n* are for example, a liquid crystal display, a plasma display, or an organic electroluminescence (EL) display. The display devices 20 are not limited to the display, but may be, for example, a projector. When the display devices are projectors, content is displayed by projecting the content to a screen, a wall, or the like from the projector.

The display devices 20-1 to 20-*n* also serve to collect attribute information of customers in the store in addition to serving as a digital signage. The display devices 20-1 to 20-*n* according to this embodiment include imaging devices 21-1 to 21-*n* (for example, cameras) as illustrated in FIG. 1. The imaging devices 21-1 to 21-*n* are provided to capture an image (a still image or a moving image) of a customer near the corresponding display devices 20-1 to 20-*n*. In this embodiment, attributes of customers included in the images are extracted from images of the surroundings of the display devices 20-1 to 20-*n* (hereinafter also referred to as "surrounding images") captured by the imaging devices 21-1 to 21-*n*.

The imaging devices 21-1 to 21-*n* are an example of a second imaging device. The surrounding image is an example of a second image. The attribute information indicating attributes of a customer extracted from a surrounding image is an example of second attribute information.

The imaging devices 21-1 to 21-*n* may be incorporated into the corresponding display devices 20-1 to 20-*n* or may be connected to the outside thereof. The imaging devices 21-1 to 21-*n* may be provided at arbitrary positions as long as it can image a customer near the corresponding display devices 20-1 to 20-*n*. For example, the imaging devices 21-1 to 21-*n* may be provided on the ceiling, wall, pillar, floor, or the like of the store.

When the imaging devices 21-1 to 21-*n* are provided outside of the display devices 20-1 to 20-*n*, the imaging devices 21-1 to 21-*n* may not be connected to the corresponding display devices 20-1 to 20-*n* but may be directly communicatively connected to the display control device 30.

(3) Display Control Device 30

The display control device 30 is a device that controls content displayed on the display devices 20-1 to 20-*n*. The display control device 30 according to this embodiment is, for example, a server device. The display control device 30 controls content displayed on the display devices 20-1 to 20-*n* on the basis of information of customers collected by the operation terminal 10, customer images captured by the imaging device 11, and surrounding images captured by the imaging devices 21-1 to 21-*n*.

Positions at which the operation terminal 10 and the display devices 20-1 to 20-*n* are installed in the store according to this embodiment will be described below with reference to FIG. 2. FIG. 2 is a diagram illustrating an example of positions at which the operation terminal 10 and the display devices 20-1 to 20-*n* are installed in the store according to this embodiment. FIG. 2 illustrates an example in which n=5. That is, five display devices such as the display devices 20-1 to 20-5 are provided in the store according to this embodiment, and the display devices include the imaging devices 21-1 to 21-5.

Figure 2:
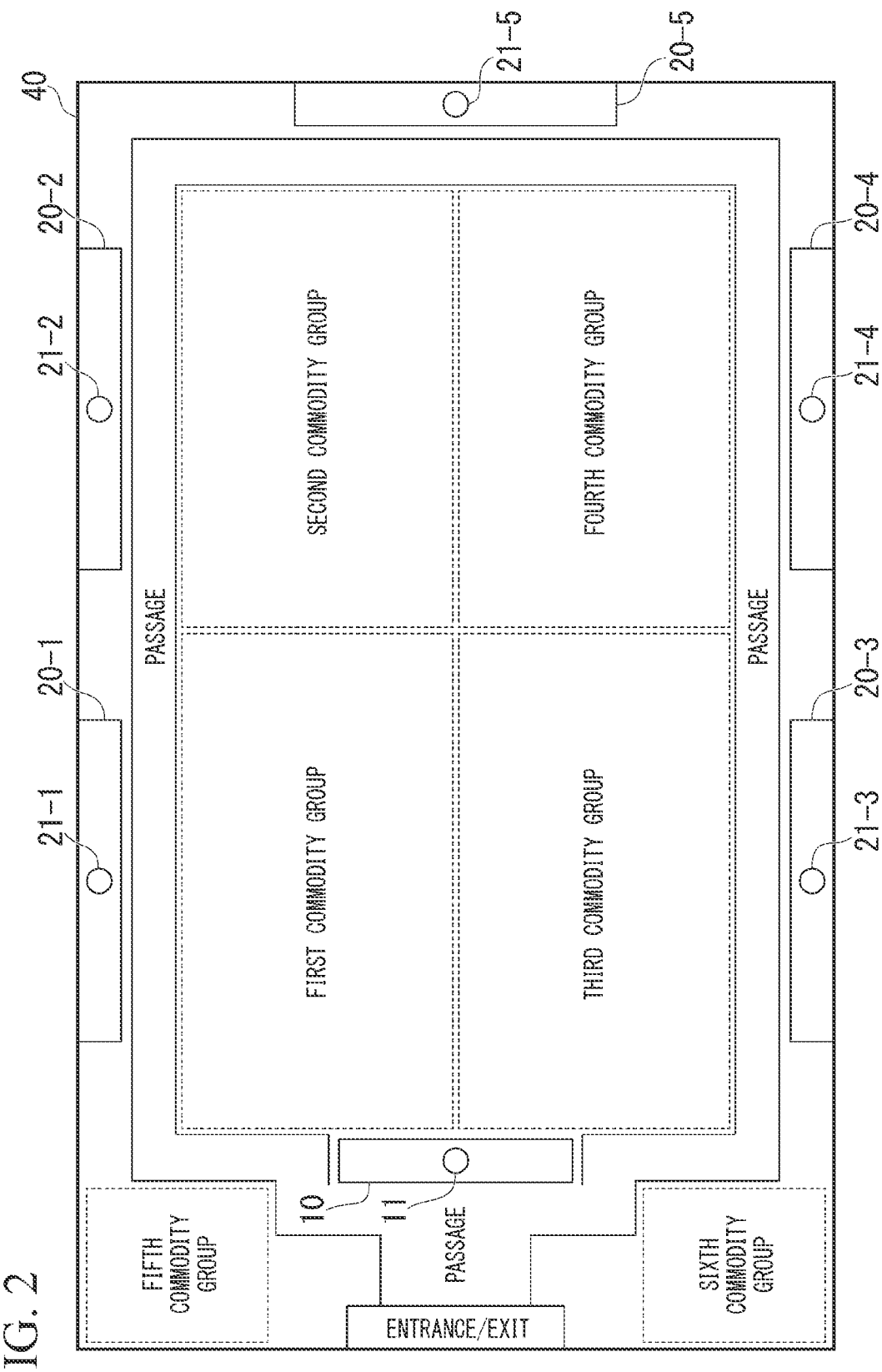
FIG. 2 is a diagram illustrating an example of positions at which an operation terminal and display devices are installed in a store according to the embodiment.

In FIG. 2, positions at which the operation terminal 10 and the display devices 20-1 to 20-5 are installed in a store 40 are displayed on a floor map of the store 40 according to this embodiment.

For example, the operation terminal 10 is installed at a position close to an entrance. The imaging device 11 is provided in the operation terminal 10 and images a customer who is operating the operation terminal 10.

The display devices 20-1 to 20-5 are installed on the wall of the store 40. The display device 20-1 is provided on the wall close to an area in which a first commodity group is displayed (hereinafter also referred to as a "first commodity group area"). The imaging device 21-1 is provided in the display device 20-1 and images the first commodity group area and a customer in a passage near the first commodity group area. The first commodity group includes, for example, a commodity AAA, and an advertisement EEE is prepared for the commodity AAA.

The display device 20-2 is provided on the wall close to an area in which a second commodity group is displayed (hereinafter also referred to as a "second commodity group area"). The imaging device 21-2 is provided in the display device 20-2 and images the second commodity group area and a customer in a passage near the second commodity group area. The second commodity group includes, for example, a commodity BBB, and an advertisement FFF is prepared for the commodity BBB.

The display device 20-3 is provided on the wall close to an area in which a third commodity group is displayed (hereinafter also referred to as a "third commodity group area"). The imaging device 21-3 is provided in the display device 20-3 and images the third commodity group area and a customer in a passage near the second commodity group area. The third commodity group includes, for example, a commodity CCC, and an advertisement GGG is prepared for the commodity CCC.

The display device 20-4 is provided on the wall close to an area in which a fourth commodity group is displayed (hereinafter also referred to as a "fourth commodity group area"). The imaging device 21-4 is provided in the display device 20-4 and images the fourth commodity group area and a customer in a passage near the second commodity group area. The fourth commodity group includes, for example, a commodity DDD, and an advertisement HHH is prepared for the commodity DDD.

The display device 20-5 is provided on the wall close to the second commodity group area and the fourth commodity group area. The imaging device 21-5 is provided in the display device 20-5 and images a customer in a passage near the second commodity group area and the fourth commodity group area.

<2. Functional Configuration of Operation Terminal>

The schematic configuration of the display system 1 according to this embodiment has been described hitherto. A functional configuration of the operation terminal 10 according to this embodiment will be described below with reference to FIGS. 3 to 6.

Figure 3:
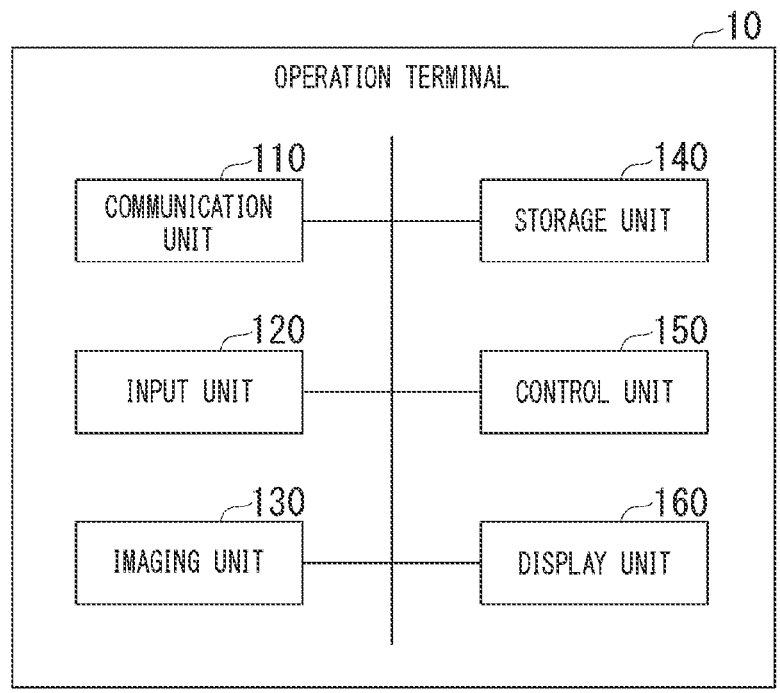
FIG. 3 is a block diagram illustrating an example of a functional configuration of the operation terminal according to the embodiment.

FIG. 3 is a block diagram illustrating the functional configuration of the operation terminal 10 according to this embodiment.

As illustrated in FIG. 3, the operation terminal 10 includes a communication unit 110, an input unit 120, an imaging unit 130, a storage unit 140, a control unit 150, and a display unit 160.

(1) Communication Unit 110

The communication unit 110 has a function of transmitting and receiving various types of information. For example, the communication unit 110 transmits operation information or a customer image to the display control device 30 via the network NW.

(2) Input Unit 120

The input unit 120 has a function of receiving an input from a customer. The input unit 120 outputs the received input to the control unit 150. The input unit 120 is realized, for example, by devices such as a touch panel, buttons, and a microphone provided as hardware in the operation terminal 10.

An applicant performs selection of a page to be displayed, input of a search keyword, selection of detailed information or advertisement information of commodities, or the like, for example, by operating the input unit 120.

(3) Imaging Unit 130

The imaging unit 130 has a function of acquiring a customer image. The imaging unit 130 is realized by the imaging device 11. The imaging unit 130 writes and stores a customer image to and in the storage unit 140. The imaging unit 130 may not store a customer image in the storage unit 140 but may transmit the customer image from the communication unit 110 to the display control device 30.

(4) Storage Unit 140

The storage unit 140 has a function of storing various types of information. The storage unit 140 is constituted by a storage medium provided as hardware in the operation terminal 10 such as a hard disk drive (HDD), a solid state drive (SSD), a flash memory, an electrically erasable programmable read only memory (EEPROM), a random access read/write memory (RAM), or a read only memory (ROM) or an arbitrary combination of the storage media.

The storage unit 140 stores, for example, operation information, customer images, and screen information displayed on the display unit 160.

(5) Control Unit 150

The control unit 150 has a function of controlling the operation of the operation terminal 10 as a whole. The control unit 150 is realized, for example, by causing a central processing unit (CPU) provided as hardware in the operation terminal 10 to execute a program.

For example, the control unit 150 controls display of a screen on the display unit 160 or controls communication between the communication unit 110 and the display control device 30 in response to an input received by the input unit 120.

(6) Display Unit 160

The display unit 160 has a function of displaying various types of information. The display unit 160 is realized, for example, by a display provided as hardware in the operation terminal 10.

The display unit 160 displays, for example, a menu screen, a floor map screen, a commodity search screen, a screen for displaying a list of detailed information or the detailed information, and a screen for displaying details of advertisement information.

An example of a screen which is displayed on the display unit 160 will be described below with reference to FIGS. 4 to 6.

Figure 4:
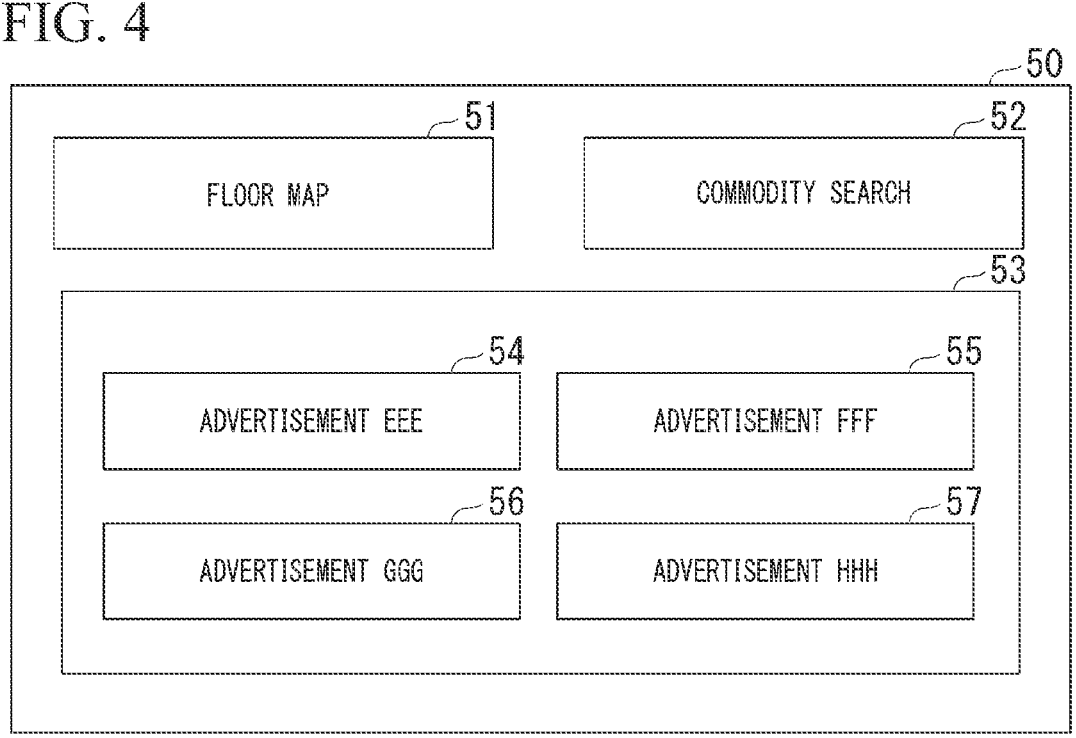
FIG. 4 is a diagram illustrating an example of a display screen (a menu screen) of the operation terminal according to the embodiment.

FIG. 4 is a diagram illustrating an example of a display screen (a menu screen) in the operation terminal 10 according to this embodiment.

On the menu screen 50 illustrated in FIG. 4, a floor map button 51, a commodity search button 52, an advertisement EEE area 53, an advertisement FFF area 54, an advertisement GGG area 55, and an advertisement HHH area 56 are displayed.

When the floor map button 51 is pushed, the screen transitions to a floor map screen. When the commodity search button 52 is pushed, the screen transitions to a commodity search screen. Advertisements are individually displayed in the advertisement EEE area 53, the advertisement FFF area 54, the advertisement GGG area 55, and the advertisement HHH area 56. In each advertisement area, only the outline of the corresponding advertisement may be displayed or details of the advertisement may be displayed. Each advertisement area may be able to be selected or pushed, and the screen transitions to the corresponding advertisement screen when the corresponding area is selected or pushed.

Figure 5:
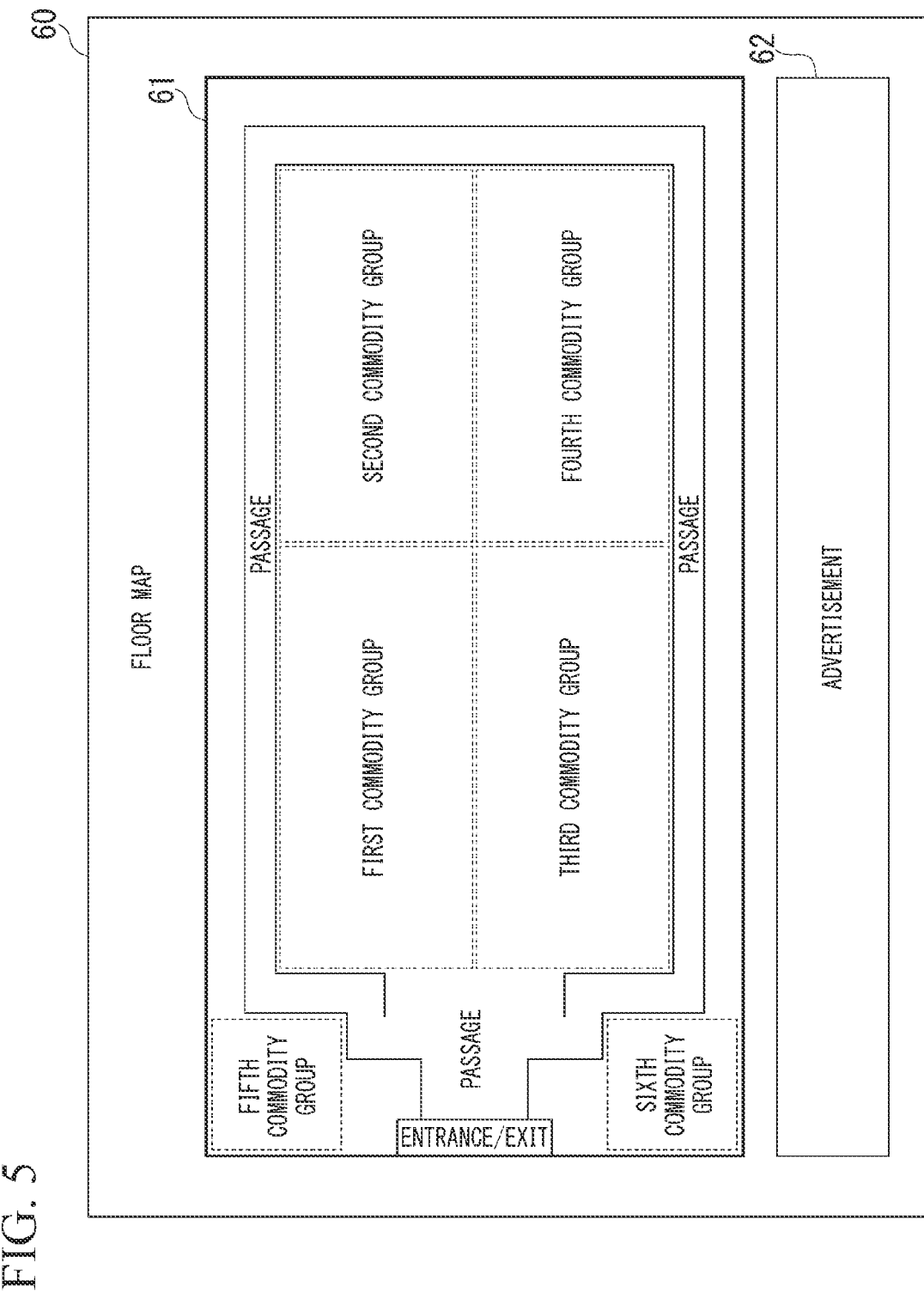
FIG. 5 is a diagram illustrating an example of a display screen (a floor map screen) of the operation terminal according to the embodiment.

FIG. 5 is a diagram illustrating an example of a display screen (a floor map screen) in the operation terminal 10 according to this embodiment.

On the floor map screen 60 illustrated in FIG. 5, a floor map 61 and an advertisement area 62 are displayed. A floor map of the store in which the operation terminal 10 is provided is displayed on the floor map 61. When the store includes a plurality of floors, floor maps of the corresponding floors can be displayed on the floor map screen 60.

The advertisement area 62 is the same as the advertisement areas illustrated in FIG. 4 and thus description thereof will be omitted.

Figure 6:
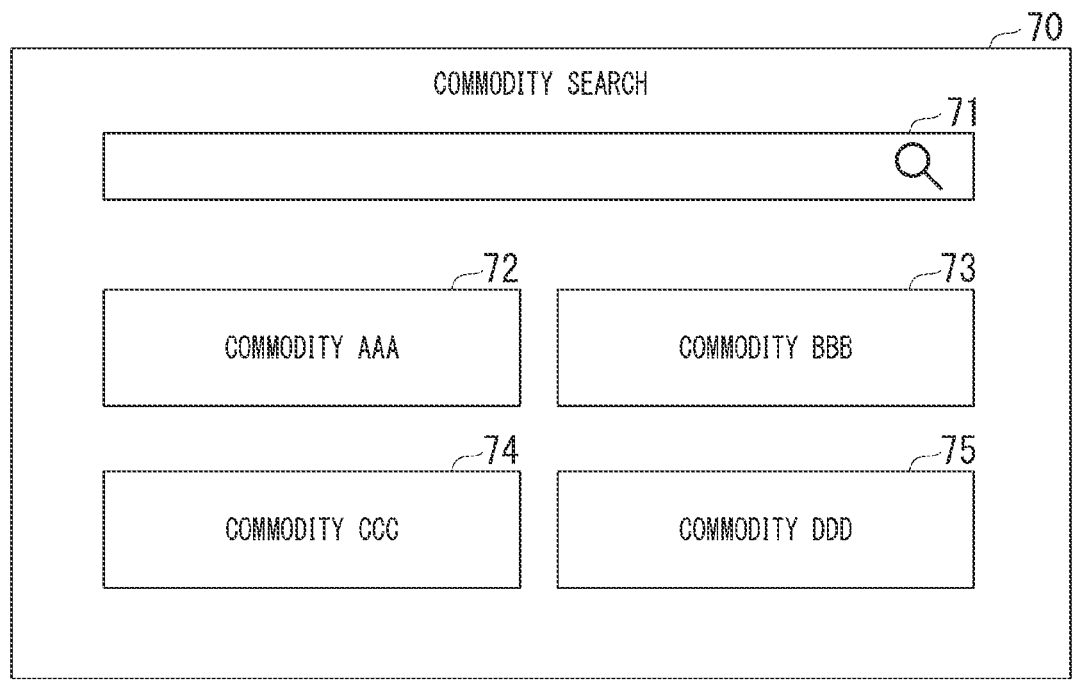
FIG. 6 is a diagram illustrating an example of a display screen (a commodity search screen) of the operation terminal according to the embodiment.

FIG. 6 is a diagram illustrating an example of a display screen (a commodity search screen) in the operation terminal 10 according to this embodiment.

On the commodity search screen 70 illustrated in FIG. 6, a search keyword input box 71, a commodity AAA area 72, a commodity BBB area 73, a commodity CCC area 74, and a commodity DDD area 75 are displayed.

Figure 7:
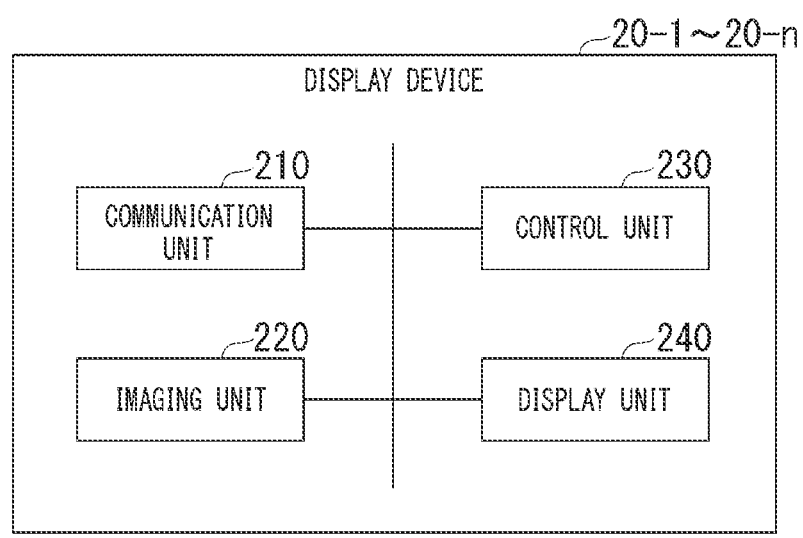
FIG. 7 is a block diagram illustrating an example of a functional configuration of a display device according to the embodiment.

The search keyword input box 71 is a box for inputting a search keyword for searching for a commodity. When a search keyword is input to the search keyword input box 71 and search is performed, a list of search results is displayed. For example, as illustrated in FIG. 7, the commodity AAA area 72, the commodity BBB area 73, the commodity CCC area 74, and the commodity DDD area 75 are displayed. In each commodity area, only the outline of the corresponding commodity may be displayed or details of the commodity may be displayed. Each commodity area may be selected or pushed, and the screen transitions to the corresponding commodity screen when each commodity area is selected or pushed.

<3. Functional Configuration of Display Device>

The functional configuration of the operation terminal 10 according to this embodiment has been described hitherto. A functional configuration of the display devices 20-1 to 20-n according to this embodiment will be described below with reference to FIG. 7.

FIG. 7 is a block diagram illustrating an example of a functional configuration of the display devices 20-1 to 20-n according to this embodiment. As illustrated in FIG. 7, each of the display devices 20-1 to 20-n includes a communication unit 210, an imaging unit 220, a control unit 230, and a display unit 240.

(1) Communication Unit 210

The communication unit 210 has a function of transmitting and receiving various types of information. For example, the communication unit 210 transmits a surrounding image to the display control device 30 via the network NW. The communication unit 210 receives content to be displayed on the display unit 240 from the display control device 30 via the network NW.

(2) Imaging Unit 220

The imaging unit 220 has a function of acquiring a surrounding image. The imaging unit 220 is realized by the corresponding imaging devices 21-1 to 21-n. The imaging unit 220 transmits the surrounding image from the communication unit 210 to the display control device 30.

(3) Control Unit 230

The control unit 230 has a function of controlling the operation of the corresponding display devices 20-1 to 20-n as a whole. The control unit 230 is realized, for example, by causing a CPU provided as hardware in the corresponding display devices 20-1 to 20-n to execute a program.

For example, the control unit 230 causes the display unit 240 to display content received from the display control device 30 by the communication unit 210 or controls communication between the communication unit 210 and the display control device 30.

(4) Display Unit 240

The display unit 240 has a function of displaying various types of information. The display unit 240 is realized, for example, by a display provided as hardware in the corresponding display devices 20-1 to 20-n.

The display unit 240 displays, for example, content received from the display control device 30 by the communication unit 210.

<4. Functional Configuration of Display Control Device>

The functional configuration of each of the display devices 20-1 to 20-n according to this embodiment has been described hitherto. A functional configuration of the display control device 30 according to this embodiment will be described below with reference to FIGS. 8 to 12.

Figure 8:
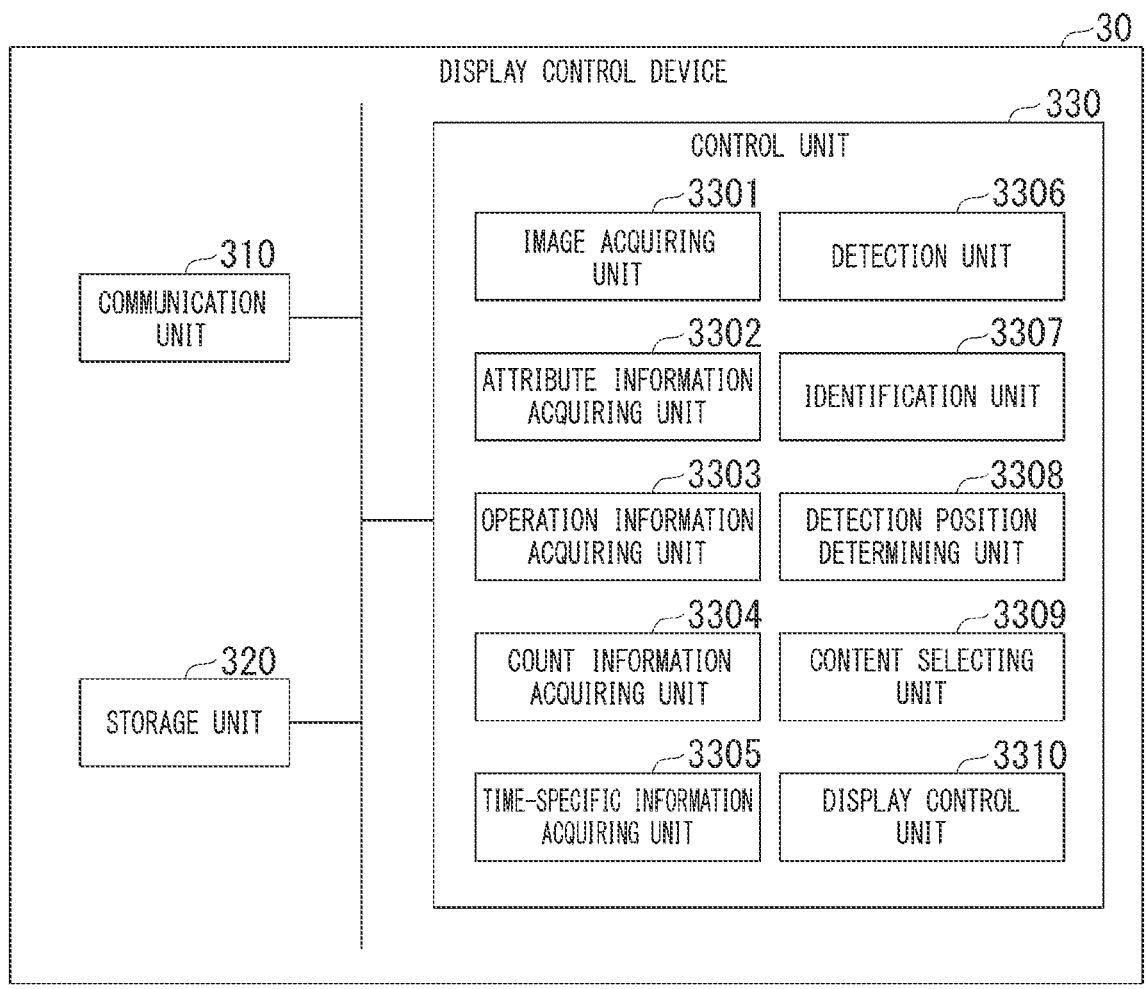
FIG. 8 is a block diagram illustrating an example of a functional configuration of a display control device according to the embodiment.

FIG. 8 is a block diagram illustrating an example of the functional configuration of the display control device 30 according to this embodiment. As illustrated in FIG. 8, the display control device 30 includes a communication unit 310, a storage unit 320, and a control unit 330.

(1) Communication Unit 310

The communication unit 310 has a function of transmitting and receiving various types of information. For example, the communication unit 310 receives operation information or a customer image from the operation terminal 10 via the network NW. The communication unit 310 receives a surrounding image from the display devices 20-1 to 20-n via the network NW. The communication unit 310 transmits content to the display devices 20-1 to 20-n via the network NW.

(2) Storage Unit 320

The storage unit 320 has a function of storing various types of information. The storage unit 320 is constituted, for example, by a storage medium provided as hardware in the display control device 30 such as an HDD, an SSD, a flash memory, an EEPROM, a RAM, or a ROM or an arbitrary combination of these storage media.

The storage unit 320 stores, for example, customer images, surrounding images, attribute information, operation information, count information, and time-specific information. The storage unit 320 stores (accumulates) the attribute information (for example, first attribute information) and the operation information in correlation.

The operation information is also information indicating a commodity in which a customer with attributes indicated by the attribute information correlated therewith is interested.

The count information is information obtained by counting the number of displays of the operation information in the past for each attribute of customers. The storage unit 320 stores the attribute information (for example, first attribute information) and the count information in correlation.

The time-specific information is information obtained by counting the number of customers having visited in the past for each attribute of customers for each time period. The storage unit 320 stores the attribute information (for example, first attribute information) and the time-specific information in correlation.

Data structures of various types of information stored in the storage unit 320 will be described below with reference to FIGS. 9 to 12.

(Attribute Information)

FIG. 9 is a diagram illustrating an example of a data structure of attribute information according to this embodiment. As illustrated in FIG. 9, the attribute information includes information indicating sex, age, hair color, dress, dress color (top), and dress color (bottom) of a customer.

In a record of a customer III, data indicating that the sex of the customer III is "male," the age is "twenties," the hair color is "black," the dress is "trousers," the dress color (top) is "yellow," and the dress color (bottom) is "black" is stored.

In a record of a customer JJJ, data indicating that the sex of the customer JJJ is "male," the age is "thirties," the hair color is "black," the dress is "trousers," the dress color (top) is "red," and the dress color (bottom) is "blue" is stored.

In a record of a customer KKK, data indicating that the sex of the customer KKK is "female," the age is "twenties," the hair color is "brown," the dress is "skirt," the dress color (top) is "white," and the dress color (bottom) is "black" is stored.

In a record of a customer LLL, data indicating that the sex of the customer LLL is "male," the age is "forties," the hair color is "blond," the dress is "trousers," the dress color (top) is "blue," and the dress color (bottom) is "blue" is stored.

In this embodiment, a customer is classified into various attributes on the basis of items of the attribute information. For example, a customer is classified on the basis of sex and age of the customer.

For example, a customer of which the sex is "male" and the age is "twenties" is classified into an attribute MMM.

A customer of which the sex is "male" and the age is "thirties" is classified into an attribute NNN.

A customer of which the sex is "male" and the age is "forties" is classified into an attribute OOO.

A customer of which the sex is "female" and the age is "twenties" is classified into an attribute PPP.

A customer of which the sex is "female" and the age is "thirties" is classified into an attribute QQQ.

In this case, the customer III in FIG. 9 is classified into the attribute MMM, the customer JJJ is classified into the attribute NNN, the customer KKK is classified into the attribute PPP, and the customer LLL is classified into the attribute OOO.

(Operation Information)

FIG. 10 is a diagram illustrating an example of a data structure of operation information according to this embodiment. For example, operation information of a customer III classified into the attribute MMM is illustrated in FIG. 10.

As illustrated in FIG. 10, the operation information includes information indicating the number of selections of each of a commodity AAA, a commodity BBB, a commodity CCC, a commodity DDD, an advertisement EEE, an advertisement FFF, an advertisement GGG, and an advertisement HHH.

In a record of the attribute MMM, data indicating that the number of selections of the commodity AAA is "0," the number of selections of the commodity BBB is "0," the number of selections of the commodity CCC is "1," the number of selections of the commodity DDD is "0," the number of selections of the advertisement EEE is "0," the number of selections of the advertisement FFF is "0." the number of selections of the advertisement GGG is "0." and the number of selections of the advertisement HHH is "1" is stored.

(Count Information)

FIG. 11 is a diagram illustrating an example of a data structure of count information according to this embodiment. For example, count information for each of the attribute MMM, the attribute NNN, the attribute OOO, the attribute PPP, and the attribute QQQ is illustrated in FIG. 11. As illustrated in FIG. 11, the count information includes information obtained by counting the number of selections of each of the commodity AAA, the commodity BBB, the commodity CCC, the commodity DDD, the advertisement EEE, the advertisement FFF, the advertisement GGG, and the advertisement HHH for each attribute of customers.

In a record of the attribute MMM, data indicating that the number of selections of the commodity AAA is "100," the number of selections of the commodity BBB is "50," the number of selections of the commodity CCC is "30," the number of selections of the commodity DDD is "20," the number of selections of the advertisement EEE is "80," the number of selections of the advertisement FFF is "60," the number of selections of the advertisement GGG is "30," and the number of selections of the advertisement HHH is "100" is stored.

In a record of the attribute NNN, data indicating that the number of selections of the commodity AAA is "40," the number of selections of the commodity BBB is "100," the number of selections of the commodity CCC is "120," the number of selections of the commodity DDD is "200," the number of selections of the advertisement EEE is "40," the number of selections of the advertisement FFF is "10," the number of selections of the advertisement GGG is "100." and the number of selections of the advertisement HHH is "30" is stored.

In a record of the attribute OOO, data indicating that the number of selections of the commodity AAA is "30," the number of selections of the commodity BBB is "120," the number of selections of the commodity CCC is "100," the number of selections of the commodity DDD is "10," the number of selections of the advertisement EEE is "100," the number of selections of the advertisement FFF is "78," the number of selections of the advertisement GGG is "30," and the number of selections of the advertisement HHH is "10" is stored.

In a record of the attribute PPP, data indicating that the number of selections of the commodity AAA is "120," the number of selections of the commodity BBB is "40," the number of selections of the commodity CCC is "200," the number of selections of the commodity DDD is "50," the number of selections of the advertisement EEE is "10," the number of selections of the advertisement FFF is "120," the number of selections of the advertisement GGG is "80," and the number of selections of the advertisement HHH is "30" is stored.

In a record of the attribute QQQ, data indicating that the number of selections of the commodity AAA is "10," the number of selections of the commodity BBB is "100," the number of selections of the commodity CCC is "40," the number of selections of the commodity DDD is "20," the number of selections of the advertisement EEE is "90," the number of selections of the advertisement FFF is "100," the number of selections of the advertisement GGG is "30," and the number of selections of the advertisement HHH is "25" is stored.

(Time-Specific Information)

FIG. 12 is a diagram illustrating an example of a data structure of time-specific information according to this embodiment. For example, time-specific information for each of the attribute MMM, the attribute NNN, the attribute OOO, the attribute PPP, and the attribute QQQ is illustrated in FIG. 12. As illustrated in FIG. 12, the time-specific information includes information obtained by counting the number of customers in each of time periods of from 9:00 to 10:00, from 10:00 to 11:00, from 11:00 to 12:00, from 12:00 to 13:00, from 13:00 to 14:00, from 14:00 to 15:00, and from 15:00 to 16:00 for each attribute of customers.

In a record of the attribute MMM, data indicating that the number of customers in the time period of from 9:00 to 10:00 is "90," the number of customers in the time period of from 10:00 to 11:00 is "40." the number of customers in the time period of from 11:00 to 12:00 is "20," the number of customers in the time period of from 12:00 to 13:00 is "10," the number of customers in the time period of from 13:00 to 14:00 is "70," the number of customers in the time period of from 14:00 to 15:00 is "50," and the number of customers in the time period of from 15:00 to 16:00 is "20" is stored.

In a record of the attribute NNN, data indicating that the number of customers in the time period of from 9:00 to 10:00 is "30," the number of customers in the time period of from 10:00 to 11:00 is "90," the number of customers in the time period of from 11:00 to 12:00 is "110," the number of customers in the time period of from 12:00 to 13:00 is "190," the number of customers in the time period of from 13:00 to 14:00 is "30," the number of customers in the time period of from 14:00 to 15:00 is "5," and the number of customers in the time period of from 15:00 to 16:00 is "90" is stored.

In a record of the attribute OOO, data indicating that the number of customers in the time period of from 9:00 to 10:00 is "20," the number of customers in the time period of from 10:00 to 11:00 is "110," the number of customers in the time period of from 11:00 to 12:00 is "90," the number of customers in the time period of from 12:00 to 13:00 is "5," the number of customers in the time period of from 13:00 to 14:00 is "90," the number of customers in the time period of from 14:00 to 15:00 is "68," and the number of customers in the time period of from 15:00 to 16:00 is "20" is stored.

In a record of the attribute PPP, data indicating that the number of customers in the time period of from 9:00 to 10:00 is "110," the number of customers in the time period of from 10:00 to 11:00 is "30," the number of customers in the time period of from 11:00 to 12:00 is "190," the number of customers in the time period of from 12:00 to 13:00 is "40," the number of customers in the time period of from 13:00 to 14:00 is "5," the number of customers in the time period of from 14:00 to 15:00 is "110," and the number of customers in the time period of from 15:00 to 16:00 is "70" is stored.

In a record of the attribute QQQ, data indicating that the number of customers in the time period of from 9:00 to 10:00 is "5." the number of customers in the time period of from 10:00 to 11:00 is "90," the number of customers in the time period of from 11:00 to 12:00 is "30," the number of customers in the time period of from 12:00 to 13:00 is "10," the number of customers in the time period of from 13:00 to 14:00 is "80," the number of customers in the time period of from 14:00 to 15:00 is "90," and the number of customers in the time period of from 15:00 to 16:00 is "20" is stored.

(3) Control Unit 330

The control unit 330 has a function of controlling the operation of the display control device 30 as a whole. The control unit 330 is realized, for example, by causing a CPU provided as hardware in the display control device 30 to execute a program.

As illustrated in FIG. 8, the control unit 330 includes an image acquiring unit 3301, an attribute information acquiring unit 3302, an operation information acquiring unit 3303, a count information acquiring unit 3304, a time-specific information acquiring unit 3305, a detection unit 3306, an identification unit 3307, a detection position determining unit 3308, a content selecting unit 3309, and a display control unit 3310.

(3-1) Image Acquiring Unit 3301

The image acquiring unit 3301 has a function of acquiring various images. For example, the image acquiring unit 3301 acquires a customer image and a customer image. Specifically, the image acquiring unit 3301 acquires a customer image from the operation terminal 10 via the communication unit 310. The image acquiring unit 3301 acquires surrounding images from the display devices 20-1 to 20-n via the communication unit 310.

(3-2) Attribute Information Acquiring Unit 3302

The attribute information acquiring unit 3302 has a function of acquiring attribute information. For example, the attribute information acquiring unit 3302 acquires attribute information (first attribute information) of a customer included in the customer image on the basis of the customer image acquired by the image acquiring unit 3301. The attribute information acquiring unit 3302 acquires attribute information (second attribute information) of a customer included in the surrounding image on the basis of the surrounding image acquired by the image acquiring unit 3301. A customer included in the images is detected by the detection unit 3306 which will be described later. The attribute information acquiring unit 3302 acquires attribute information of the customer detected by the detection unit 3306.

(3-3) Operation Information Acquiring Unit 3303

The operation information acquiring unit 3303 has a function of acquiring operation information. For example, the operation information acquiring unit 3303 acquires operation information indicating commodity information displayed on the operation terminal 10 according to a customer's operation from the operation terminal 10 via the communication unit 310. The operation information acquiring unit 3303 writes and stores the acquired operation to and in the storage unit 320.

Commodity information displayed in this visit of a customer is, that is, commodity information of a commodity in which the customer is interested in this visit. Accordingly, the operation information acquiring unit 3303 can acquire information indicating the commodity in which the customer is interested in this visit by acquiring the operation information from the operation terminal 10.

The operation information acquiring unit 3303 acquires operation information of a customer identified by the identification unit 3307 which will be described later from the storage unit 320. The identified customer is a customer detected near the display devices 20-1 to 20-n provided in the store after the customer has visited the store and operated the operation terminal 10. Accordingly, the operation information acquiring unit 3303 can acquire information indicating a commodity in which the customer detected near the display devices 20-1 to 20-n is interested in this visit by acquiring the operation information from the storage unit 320.

(3-4) Count Information Acquiring Unit 3304

The count information acquiring unit 3304 has a function of acquiring count information. For example, the count information acquiring unit 3304 acquires count information by generating count information on the basis of the operation information acquired from the operation terminal 10 by the operation information acquiring unit 3303.

Specifically, the count information acquiring unit 3304 generates the count information by adding the operation information acquired in this time by the operation information acquiring unit 3303 to the operation information acquired in the past by the operation information acquiring unit 3303. The count information acquiring unit 3304 writes and stores the generated count information to and in the storage unit 320. The count information acquiring unit 3304 updates the count information by repeating the addition when the operation information acquiring unit 3303 acquires the operation information from the operation terminal 10.

(3-5) Time-Specific Information Acquiring Unit 3305

The time-specific information acquiring unit 3305 has a function of acquiring time-specific information. For example, the time-specific information acquiring unit 3305 first acquires a time at which the attribute information acquiring unit 3302 has acquired the attribute information of a customer from the customer image. The time-specific information acquiring unit 3305 acquires the time-specific information by generating time-specific information on the basis of the acquired time and the attribute information of a customer acquired by the attribute information acquiring unit 3302.

Specifically, the time-specific information acquiring unit 3305 generates the time-specific information by adding the number of customers with the attribute indicated by the acquired attribute information in the time period indicated by the acquired time. The time-specific information acquiring unit 3305 writes and stores the generated time-specific information to and in the storage unit 320. The time-specific information acquiring unit 3305 updates the time-specific information by repeating the addition when the attribute information acquiring unit 3302 acquires the attribute information of a customer from the customer image.

(3-6) Detection Unit 3306

The detection unit 3306 has a function of detecting a customer. For example, the detection unit 3306 detects a customer included in a customer image from the customer image acquired by the image acquiring unit 3301. The detection unit 3306 detects a customer included in a surrounding image from the surrounding image acquired by the image acquiring unit 3301.

(3-7) Identification Unit 3307

The identification unit 3307 has a function of identifying a customer. For example, the identification unit 3307 identifies a customer included in the surrounding image captured by the imaging devices 21-1 to 21-n of the display devices 20-1 to 20-n out of customers who have operated the operation terminal 10 to display commodity information. That is, the identification unit 3307 can identify who out of the customers having operated the operation terminal 10 a customer near the display devices 20-1 to 20-n is.

Specifically, the identification unit 3307 identifies a customer included in the surrounding image on the basis of whether attributes of the customer included in the customer image and attributes of the customer included in the surrounding image match.

More specifically, when a customer included in the surrounding image has been detected by the detection unit 3306 and attribute information of the detected customer has been acquired by the attribute information acquiring unit 3302, the identification unit 3307 ascertains whether attribute information matching the attribute information acquired by the attribute information acquiring unit 3302 is included in the attribute information stored in the storage unit 320.

When there is matched attribute information, the identification unit 3307 identifies the customer corresponding to the matched attribute information as being the customer included in the surrounding image. When there is no matched attribute information, the identification unit 3307 determines that the customer included in the surrounding image has not been identified. That is, the customer which has not been identified by the identification unit 3307 does not operates the operation terminal 10 when visiting the store.

(3-8) Detection Position Determining Unit 3308

The detection position determining unit 3308 has a function of determining a position at which a customer has been detected. For example, when a customer has been detected by the detection unit 3306, the detection position determining unit 3308 determines the position at which the customer has been detected on the basis of by which of the imaging devices 21-1 to 21-n the surrounding image including the customer has been captured.

For example, it is assumed that the surrounding image including the detected customer is an image captured by the imaging device 21-1. When the imaging device 21-1 is provided at the position in the example illustrated in FIG. 2, the detection position determining unit 3308 determines that the customer has been detected in the first commodity group area or in a passage near the first commodity group area.

The detection position determining unit 3308 determines whether the detected customer is located in the vicinity of the commodity indicated by the operation information on the basis of the determined position of the customer and the operation information acquired from the storage unit 320 by the operation information acquiring unit 3303. That is, the detection position determining unit 3308 determines whether the detected customer is located close to the commodity in which the customer is interested.

For example, it is assumed that a customer has been detected in the first commodity group area or a passage near the first commodity group area and the customer's operation information indicates that at least one of the commodity AAA and the advertisement EEE has been selected. In this case, the detection position determining unit 3308 determines that the detected customer is located close to the commodity in which the customer is interested. On the other hand, it is assumed that a customer has been detected in the first commodity group area or a passage near the first commodity group area and the customer's operation information indicates that commodity information other than the commodity AAA and the advertisement EEE has been selected. In this case, the detection position determining unit 3308 determines that the detected customer is not located close to the commodity in which the customer is interested.

(3-9) Content Selecting Unit 3309

The content selecting unit 3309 has a function of selecting content. For example, the content selecting unit 3309 selects content on the basis of the attribute information (first attribute information and second attribute information) acquired by the attribute information acquiring unit 3302 and the operation information acquired from the storage unit 320 by the operation information acquiring unit 3303. The content selected by the content selecting unit 3309 is, for example, content associated with a commodity corresponding to the commodity information displayed on the operation terminal 10 according to a customer's operation in this visit.

The commodity information displayed on the operation terminal 10 according to a customer's operation in this visit is, that is, commodity information of a commodity in which the customer is interested in this visit. Accordingly, the content selecting unit 3309 can select content associated with the commodity in which the customer is interested by selecting content on the basis of the attribute information and the operation information.

The content selecting unit 3309 acquires operation information corresponding to attribute information of a customer detected in an area in which commodities are displayed from the storage unit 320 and selects content on the basis of the acquired operation information.

For example, when the customer detected in the area in which commodities are displayed has been detected in an area in which the commodity in which the customer is interested is displayed, the content selecting unit 3309 selects content associated with a commodity corresponding to the commodity information indicated by the operation information corresponding to the attribute information of the detected customer.

For example, when the operation information of the customer indicates that at least one of the commodity AAA and the advertisement EEE has been selected and the customer has been detected in the first commodity group area or a passage near the first commodity group area, the content selecting unit 3309 selects content associated with the commodity AAA.

In this way, when a customer has been detected in an area in which a commodity in which the customer is interested is displayed, the content selecting unit 3309 can select content associated with the commodity in which the customer is interested and which is displayed in the area.

The content selecting unit 3309 selects content on the basis of attribute information of a customer detected in an area in which commodities are displayed and count information stored in the storage unit 320.

For example, when a customer detected in an area in which commodities are displayed has been detected in an area in which a commodity in which the customer is interested is interested is not displayed, the content selecting unit 3309 selects content appropriate for attributes of the customer on the basis of the count information.

For example, the content selecting unit 3309 identifies commodity information with the largest number of displays in the attributes of the detected customer from the count information and selects content associated with a commodity corresponding to the identified commodity information.

For example, when a customer's operation information indicates that at least one of the commodity AAA and the advertisement EEE has been selected and the customer has been detected in an area other than the first commodity group area or the passage near the first commodity group area, the content selecting unit 3309 selects content associated with a commodity with the largest number of selections in the attributes of the detected customer instead of content associated with the commodity AAA.

Specifically, when the attributes of the detected customer includes the attribute NNN and the count information is data illustrated in FIG. 11, the content selecting unit 3309 identifies a commodity with the largest number of selections as being the commodity DDD (the number of selections=200) from the count information. Then, the content selecting unit 3309 selects content associated with the identified commodity DDD.

In this way, when a customer has been detected in an area in which a commodity in which the customer is interested is not displayed, the content selecting unit 3309 can select appropriate content according to the attributes of the customer.

The content selecting unit 3309 selects content on the basis of the time-specific information and the count information stored in the storage unit 320.

For example, when a customer who has operated the operation terminal 10 to display commodity information has not been detected, the content selecting unit 3309 select content appropriate for a current time period on the basis of the time-specific information and the count information.

For example, the content selecting unit 3309 identifies attributes of customers with the largest number of visits in the current time period from the time-specific information, identifies commodity information with the largest number of displays in the identified attributes of customers from the count information, and selects content associated with a commodity corresponding to the identified commodity information.

For example, it is assumed that a current time is 11:30, the time-specific information is data illustrated in FIG. 12, and the count information is data illustrated in FIG. 11. In this case, the content selecting unit 3309 first identifies an attribute with the largest number of visits in the time period of from 11:00 to 12:00 as being the attribute PPP (the number of visits=190) from the time-specific information. Subsequently, the content selecting unit 3309 identifies a commodity with the largest number of selections in the attribute PPP as being the commodity CCC (the number of selections=200) from the count information. Then, the content selecting unit 3309 selects content associated with the identified commodity CCC.

In this way, when a customer having operated the operation terminal 10 has not been detected, the content selecting unit 3309 can select content more appropriate for a customer visiting in the current time period.

(3-10) Display Control Unit 3310

The display control unit 3310 has a function of controlling display of content. For example, the display control unit 3310 displays the content selected by the content selecting unit 3309 on at least one of the display devices 20-1 to 20-*n*.

When a customer having operated the operation terminal 10 to display commodity information has been detected, the display control unit 3310 displays the selected content on the display device provided at a position corresponding to the area in which the customer has been detected out of the display devices 20-1 to 20-*n*.

For example, it is assumed that a customer has been detected in an area in which a commodity in which the customer is interested is displayed by the detection unit 3306. In this case, the display control unit 3310 displays content associated with the commodity in which the customer is interested and which is selected by the content selecting unit 3309 on the display device closest to the area in which the customer has been detected out of the display devices 20-1 to 20-*n*. Accordingly, for example, it is possible to enhance purchase desire of the customer for the commodity in which the customer is interested.

It is assumed that a customer has been detected in an area in which a commodity in which the customer is interested is not displayed by the detection unit 3306. In this case, the display control unit 3310 displays content appropriate for the attribute of the customer and selected by the content selecting unit 3309 and which is selected by the content selecting unit 3309 on the display device closest to the area in which the customer has been detected out of the display devices 20-1 to 20-*n*. Accordingly, for example, it is possible to attract the customer's attention to a commodity in which the customer is not interested or to enhance purchase desire of the customer for a commodity in which the customer is not interested. This is more effective when the detected customer purchases the commodity in which the customer is interested.

That is, the display control unit 3310 can display content with a higher advertising effect for the detected customer on the display devices 20-1 to 20-*n*.

On the other hand, when a customer having operated the operation terminal 10 to select commodity information has not been detected, the display control unit 3310 displays the selected content on all the display devices 20-1 to 20-*n* provided in the store.

For example, when a customer having operated the operation terminal 10 has not been detected by the detection unit 3306, the display control unit 3310 displays content more appropriate for a customer visiting the store in the current time period and selected by the content selecting unit 3309 on all the display devices 20-1 to 20-$n$. Accordingly, the display control unit 3310 can display content appropriate for more customers in the current time period on the display devices 20-1 to 20-$n$. That is, the display control unit 3310 can display content with a higher advertising effect in the current time period on the display devices 20-1 to 20-$n$.

<5. Operation>

Figure 13:
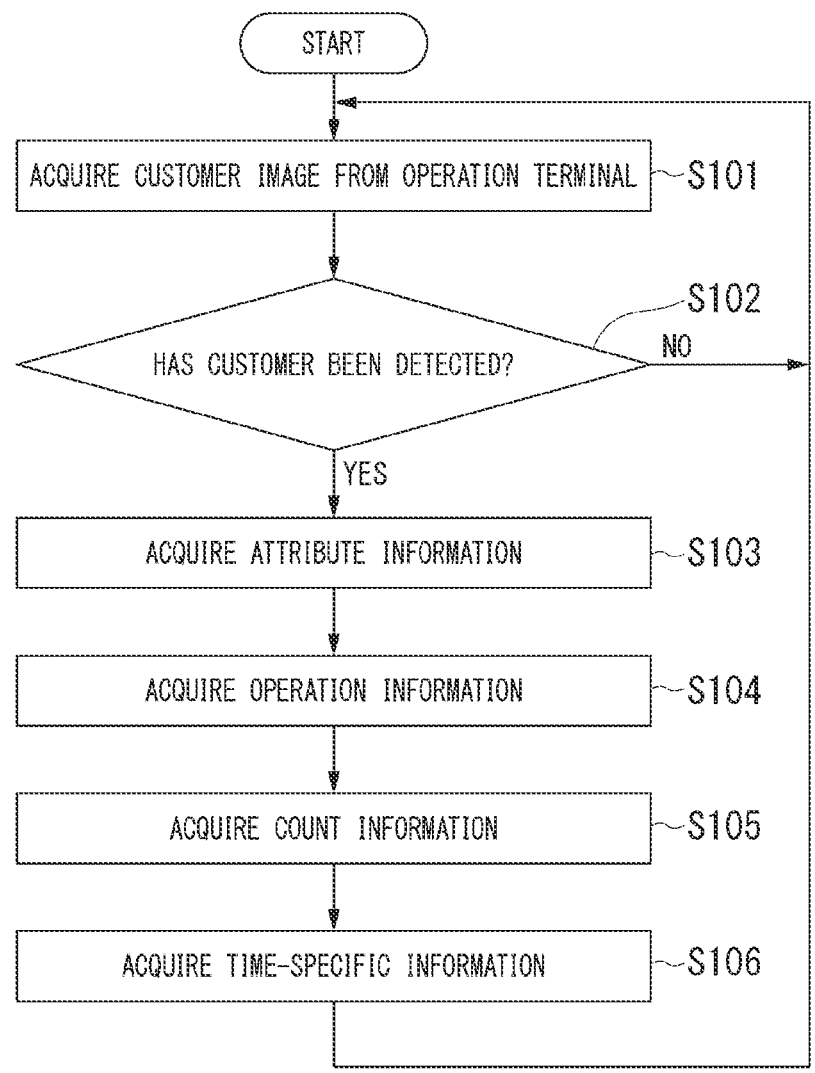
FIG. 13 is a flowchart illustrating an example of a routine of operations which is performed at the time of acquisition of a customer image according to the embodiment.
Figure 14:
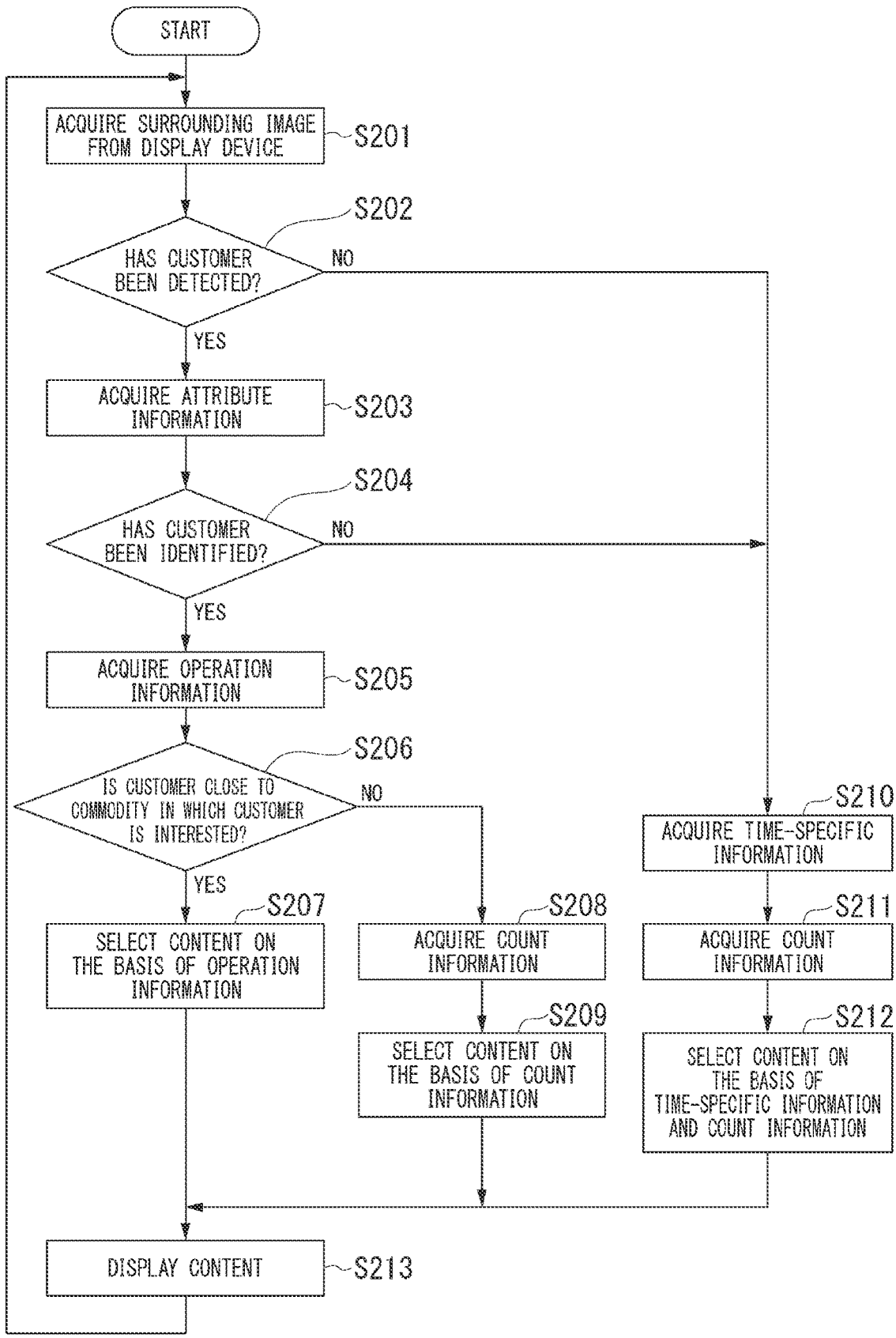
FIG. 14 is a flowchart illustrating an example of a routine of operations which is performed at the time of acquisition of a surrounding image according to the embodiment.

The functional configuration of the display control device 30 according to this embodiment has been described hitherto. Operations of the display system 1 according to this embodiment will be described below with reference to FIGS. 13 and 14. FIG. 13 is a flowchart illustrating an example of a routine of operations which is performed at the time of acquisition of a customer image according to this embodiment. FIG. 14 is a flowchart illustrating a routine of operations which is performed at the time of acquisition of a surrounding image according to this embodiment.

(1) Operation at the Time of Acquisition of Customer Image

As illustrated in FIG. 13, first, the image acquiring unit 3301 of the display control device 30 acquires a customer image from the operation terminal 10 (Step S101). Specifically, the image acquiring unit 3301 acquires a customer image captured by the imaging device 11 provided in the operation terminal 10 from the operation terminal 10 via the communication unit 310 of the display control device 30. The image acquiring unit 3301 writes and stores the acquired customer image to and in the storage unit 320 of the display control device 30.

Subsequently, the detection unit 3306 of the display control device 30 performs a process of detecting a customer (Step S102). Specifically, the detection unit 3306 performs a process of detecting a customer included in a customer image acquired by the image acquiring unit 3301 from the customer image.

When a customer has been detected in the process (Step S102/YES), the display control device 30 performs the process of Step S103. On the other hand, when a customer has not been detected (Step S102: NO), the display control device 30 repeats the routine from Step S101.

In Step S103, the attribute information acquiring unit 3302 of the display control device 30 acquires attribute information (first attribute information) (Step S103). Specifically, the attribute information acquiring unit 3302 acquires attribute information of the customer detected by the detection unit 3306 from the customer image acquired by the image acquiring unit 3301. The attribute information acquiring unit 3302 writes and stores the acquired attribute information to and in the storage unit 320.

Subsequently, the operation information acquiring unit 3303 of the display control device 30 acquires operation information (Step S104). Specifically, the operation information acquiring unit 3303 acquires operation information of the customer detected by the detection unit 3306 from the operation terminal 10 via the communication unit 310. The operation information acquiring unit 3303 writes and stores the acquired operation information to and in the storage unit 320.

Subsequently, the count information acquiring unit 3304 of the display control device 30 acquires count information (Step S105). Specifically, the count information acquiring unit 3304 generates and acquires the count information on the basis of the operation information acquired by the operation information acquiring unit 3303. The count information acquiring unit 3304 writes and stores the acquired count information to and in the storage unit 320.

Subsequently, the time-specific information acquiring unit 3305 of the display control device 30 acquires time-specific information (Step S106). Specifically, the time-specific information acquiring unit 3305 generates and acquires time-specific information on the basis of a time at which the attribute information acquiring unit 3302 has acquired the attribute information of the customer from the customer image and the attribute information of the customer acquired by the attribute information acquiring unit 3302. The time-specific information acquiring unit 3305 writes and stores the acquired time-specific information to and in the storage unit 320.

After Step S106, the display control device 30 repeats the routine from Step S101.

(2) Operation at the Time of Acquisition of Surrounding Image

As illustrated in FIG. 14, first, the image acquiring unit 3301 acquires a surround image from the display devices 20-1 to 20-$n$ (Step S201). Specifically, the image acquiring unit 3301 acquires a surrounding image captured by the imaging devices 21-1 to 21-$n$ provided in the display devices 20-1 to 20-$n$ from the display devices 20-1 to 20-$n$ via the communication unit 310. The image acquiring unit 3301 writes and stores the acquired surrounding image to and in the storage unit 320.

Subsequently, the detection unit 3306 performs a process of detecting a customer (Step S202). Specifically, the detection unit 3306 detects a customer included in the surrounding image from the surrounding image acquired by the image acquiring unit 3301.

When a customer has been detected in the process (Step S202/YES), the display control device 30 performs the process of Step S203. On the other hand, when a customer has not been detected (Step S202: NO), the display control device 30 performs the process of Step S210.

In Step S203, the attribute information acquiring unit 3302 acquires attribute information (second attribute information) (Step S203). Specifically, the attribute information acquiring unit 3302 acquires attribute information of the customer detected by the detection unit 3306 from the surrounding image acquired by the image acquiring unit 3301. The attribute information acquiring unit 3302 writes and stores the acquired attribute information to and in the storage unit 320.

Subsequently, the identification unit 3307 of the display control device 30 performs a process of identifying a customer (Step S204). Specifically, the identification unit 3307 identifies attribute information matching the attribute information (second attribute information) acquired from the surrounding image by the attribute information acquiring unit 3302 out of the attribute information (first attribute information) stored in the storage unit 320. The identification unit 3307 identifies a customer included in the surrounding image as being a customer corresponding to the identified attribute information.

When a customer has been identified in the process (Step S204/YES), the display control device 30 performs the process of Step 205. On the other hand, when a customer has not been identified (Step S204/NO), the display control device 30 performs the process of Step S210.

In Step S205, the operation information acquiring unit 3303 acquires operation information (Step S205). Specifically, the operation information acquiring unit 3303 acquires operation information of the customer identified by the identification unit 3307 from the storage unit 320.

Subsequently, the detection position determining unit 3308 of the display control device 30 determines a detection position of the customer (Step S206). Specifically, the detection position determining unit 3308 determines whether the detected customer is located close to a commodity in which the customer is interested on the basis of the position at which the imaging devices 21-1 to 21-$n$ capturing the surrounding image including the customer detected by the detection unit 3306 is provided and the operation information of the customer acquired from the storage unit 320 by the operation information acquiring unit 3303.

When it is determined that the customer is located close to the commodity in which the customer is interested (Step S206/YES), the display control device 30 performs the process of Step S207. On the other hand, when it is determined that the customer is not located close to the commodity in which the customer is interested (Step S206/NO), the display control device 30 performs the process of Step S208.

In Step S207, the content selecting unit 3309 of the display control device 30 selects content on the basis of the operation information (Step S207). Specifically, the content selecting unit 3309 selects content associated with a commodity corresponding to the commodity information selected by the customer and indicated by the operation information acquired from the storage unit 320 by the operation information acquiring unit 3303.

In Step S208, the content selecting unit 3309 acquires count information (Step S208). Specifically, the content selecting unit 3309 acquires count information from the storage unit 320.

Subsequently, the content selecting unit 3309 selects content on the basis of the count information (Step S209). Specifically, the content selecting unit 3309 selects content associated with a commodity corresponding to the commodity information with the largest number of selections in the attribute of the detected customer indicated by the count information acquired from the storage unit 320.

In Step S210, the content selecting unit 3309 acquires time-specific information (Step S210). Specifically, the content selecting unit 3309 acquires time-specific information from the storage unit 320.

Subsequently, the content selecting unit 3309 acquires count information (Step S211). Specifically, the content selecting unit 3309 acquires count information from the storage unit 320.

Subsequently, the content selecting unit 3309 selects content on the basis of the time-specific information and the count information (Step S212). Specifically, the content selecting unit 3309 identifies the attribute of customers with the largest number of visits in the current time period from the time-specific information and selects content associated with a commodity corresponding to the commodity information with the largest number of selections in the identified attribute of customers.

After content has been selected in one of Steps S207, S209, and S212, the display control unit 3310 of the display control device 30 displays the content on at least one of the display devices 20-1 to 20-$n$ (Step S213). Specifically, when content has been selected in Step S207 or S209, the display control unit 3310 displays the selected content on the display device provided at the position corresponding to the detection position of the customer out of the display devices 20-1 to 20-$n$. When content has been selected in Step S212, the display control unit 3310 displays the selected content on all the display devices 20-1 to 20-$n$ provided in the store.

After Step S213, the display control device 30 repeats the routine from Step S201.

As described above, the display control device 30 according to this embodiment includes the attribute information acquiring unit 3302, the operation information acquiring unit 3303, the content selecting unit 3309, and the display control unit 3310.

The attribute information acquiring unit 3302 acquires attribute information (first attribute information) indicating attributes of a person on the basis of an image (a first image) obtained by imaging the person who is operating the operation terminal 10 using the imaging device 11 (the first imaging device) provided in the operation terminal 10 displaying commodity information according to an operation thereon. The attribute information acquiring unit 3302 acquires attribute information (second attribute information) indicating attributes of a person included in an image (a second image) captured by the imaging devices 21-1 to 21-$n$ (the second imaging device) provided in the display devices 20-1 to 20-$n$ different from the operation terminal 10 on the basis of the image.

The operation information acquiring unit 3303 acquires operation information indicating the commodity information displayed on the operation terminal 10 from the operation terminal 10.

The content selecting unit 3309 selects content on the basis of the acquired attribute information (first attribute information), the acquired attribute information (second attribute information), and the acquired operation information.

The display control unit 3310 displays the selected content on the display devices 20-1 to 20-$n$.

With this configuration, the display control device 30 according to this embodiment can identify a commodity in which a customer visiting the store is interested from commodity information selected by allowing the customer to operate the operation terminal 10 and select content associated with the identified commodity as content to be displayed on the display devices 20-1 to 20-$n$.

Accordingly, the display control device 30 according to this embodiment enables content associated with a commodity in which a customer visiting the store is interested in this visit to be displayed.

Some functions of the display control device 30 may be provided in the operation terminal 10 or the display devices 20-1 to 20-$n$.

For example, the operation terminal 10 may have the functions of the attribute information acquiring unit 3302, the count information acquiring unit 3304, the time-specific information acquiring unit 3305, or the detection unit 3306. In this case, the operation terminal 10 can detect a customer from an image captured by the imaging device 11 provided in the operation terminal. The operation terminal 10 can acquire attribute information of the detected customer or acquire count information or time-specific information from the operation information. Then, the operation terminal 10 transmits the detected information or the acquired information to the display control device 30. The display control device 30 performs the processes on the basis of various types of information received from the operation terminal 10.

The display devices 20-1 to 20-$n$ may have the function of the attribute information acquiring unit 3302 or the detection unit 3306. In this case, each of the display devices 20-1 to 20-$n$ can detect a customer from an image captured by one of the imaging devices 21-1 to 21-$n$ provided in the host display device. Each of the display devices 20-1 to 20-$n$ can acquire attribute information of the detected customer. Then, each of the display devices 20-1 to 20-*n* transmits the detected information or the acquired information to the display control device 30. The display control device 30 performs various processes on the basis of various types of information received from the display devices 20-1 to 20-*n*.

In the aforementioned embodiment, attribute information (first attribute information) and operation information are correlated and stored in the storage unit 320, but the present invention is not limited to this example. For example, the storage unit 320 may store attribute information, operation information, and a time at which the attribute information and the operation information have been acquired in correlation.

The content selecting unit 3309 acquires content on the basis of the operation information acquired at a time closer to (for example, within 30 minutes from) the time at which a customer has been detected in an area in which commodities are displayed. Specifically, the content selecting unit 3309 acquires the operation information correlated with the attribute information acquired at a time closer to the time at which the customer has been detected from the storage unit 320 when the operation information corresponding to the attribute information (second attribute information) of the customer detected in the area in which commodities are displayed is acquired from the storage unit 320. The content selecting unit 3309 selects content on the basis of the acquired operation information.

The content selecting unit 3309 may select content by considering that attribute information (first attribute information) of a customer acquired from a customer image captured by the imaging device 11 provided in the operation terminal 10 is more important than attribute information (second attribute information) of the customer acquired from a surrounding image captured by the imaging devices 21-1 to 21-*n* provided in the vicinity of the display devices 20-1 to 20-*n*.

An embodiment of the present invention has been described hitherto. All or some functions of the display control device 30 according to the embodiment may be realized by a computer. In this case, a program for realizing the functions may be recorded on a computer-readable recording medium, and the program recorded on the recording medium may be read and executed by a computer system to realize the functions. The "computer system" mentioned herein may include an operating system (OS) or hardware such as peripherals. Examples of the "computer-readable recording medium" include a portable medium such as a flexible disk, a magneto-optical disc, a ROM, or a CD-ROM and a storage device such as a hard disk incorporated into a computer system. The "computer-readable recording medium" may include a medium that dynamically holds a program for a short time such as a communication line when a program is transmitted via a network such as the Internet or a communication line such as a telephone line or a medium that holds a program for a predetermined time such as a volatile memory in a computer system serving as a server or a client in that case. The program may be a program for realizing some of the aforementioned functions. The program may be a program which can realize the aforementioned functions in combination with another program stored in advance in the computer system. The program may be realized using a programmable logic device such as a field programmable gate array (FPGA).

While an embodiment of the present invention has been described above in detail with reference to the drawings, a specific configuration of the present invention is not limited to the embodiment and the present invention can be subjected to various modifications in design without departing from the gist of the present invention.

Figure 15:
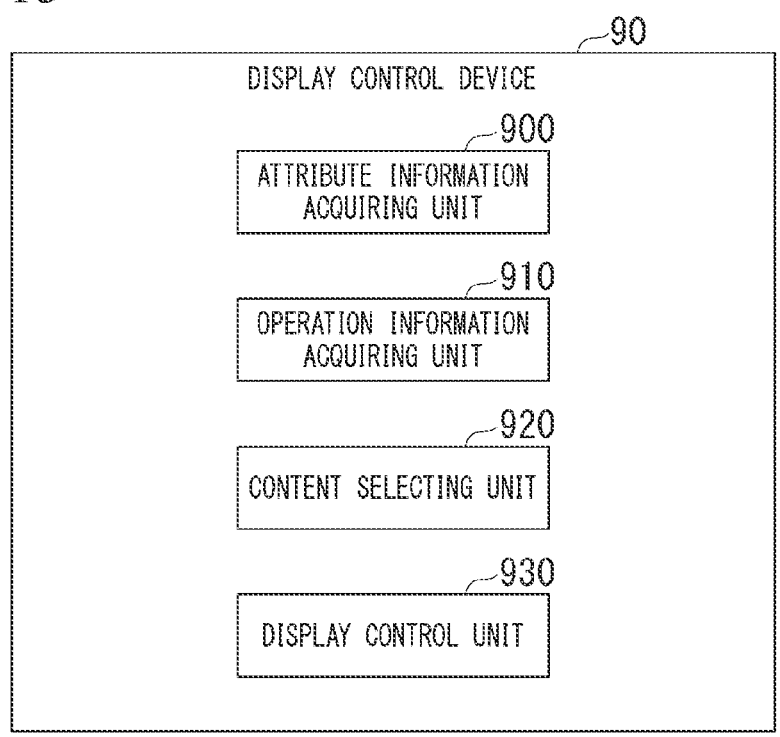
FIG. 15 is a block diagram illustrating the display control device with a minimum configuration according to the embodiment.

A display control device 90 with a minimum configuration according to the embodiment of the present invention will be described below with reference to FIG. 15. FIG. 15 is a block diagram illustrating the display control device 90 with a minimum configuration according to the embodiment.

As illustrated in FIG. 15, the display control device 90 includes at least an attribute information acquiring unit 900, an operation information acquiring unit 910, a content selecting unit 920, and a display control unit 930.

The attribute information acquiring unit 900 acquires attribute information (first attribute information) indicating attributes of a person who is operating an operation terminal displaying commodity information according to an operation on the basis of an image (a first image) obtained by imaging the person using an imaging device (a first imaging device) provided in the operation terminal. The attribute information acquiring unit 900 acquires attribute information (second attribute information) indicating attributes of a person included in the image on the basis of an image (a second image) captured by an imaging device (a second imaging device) provided in a display device different from the operation terminal.

The operation information acquiring unit 910 acquires operation information indicating commodity information displayed on the operation terminal from the operation terminal.

The content selecting unit 920 selects content on the basis of the acquired attribute information (first attribute information), the acquired attribute information (second attribute information), and the acquired operation information.

The display control unit 930 displays the selected content on the display device.

REFERENCE SIGNS LIST

1 . . . Display system
10 . . . Operation terminal
11 . . . Imaging device
20-1 to 20-*n* . . . Display device
21-1 to 21-*n* . . . Imaging device
30, 90 . . . Display control device
110 . . . Communication unit
120 . . . Input unit
130 . . . Imaging unit
140 . . . Storage unit
150 . . . Control unit
160 . . . Display unit
210 . . . Communication unit
220 . . . Imaging unit
230 . . . Control unit
240 . . . Display unit
310 . . . Communication unit
320 . . . Storage unit
330 . . . Control unit
3301 . . . Image acquiring unit
3302, 900 . . . Attribute information acquiring unit
3303, 910 . . . Operation information acquiring unit
3304 . . . Count information acquiring unit
3305 . . . Time-specific information acquiring unit
3306 . . . Detection unit
3307 . . . Identification unit
3308 . . . Detection position determining unit
3309, 920 . . . Content selecting unit
3310, 930 . . . Display control unit
NW . . . Network

What is claimed is:

1. A display control device comprising:
an attribute information acquiring unit configured to acquire first attribute information indicating attributes of a person who is operating an operation terminal displaying commodity information in response to an operation on the basis of a first image obtained by imaging the person using a first imaging device provided in the operation terminal and to acquire second attribute information indicating person's attributes included in a second image captured by a second imaging device provided in a display device different from the operation terminal on the basis of the second image;
an operation information acquiring unit configured to acquire operation information indicating the commodity information displayed on the operation terminal from the operation terminal;
a content selecting unit configured to select content on the basis of the acquired first attribute information, the acquired second attribute information, and the acquired operation information; and
a display control unit configured to display the selected content on the display device, and
wherein the content selecting unit is configured to select content corresponding to a current time period on the basis of a time-specific information and a count information when the person, who has operated the operation terminal to display the commodity information, has not been detected, wherein the time-specific information has been obtained by counting the number of store-visited persons having visited a store in the past for each attribute for each time period, and wherein the count information has been obtained by counting the number of displays displaying the commodity information on the operation terminal by the operation of the person for each of the person's attributes.

2. The display control device according to claim 1, further comprising:
a storage unit configured to store the acquired first attribute information and the acquired operation information in correlation,
wherein the content selecting unit acquires operation information corresponding to the second attribute information of the person detected in an area in which commodities are displayed from the storage unit and selects the content on the basis of the acquired operation information.

3. The display control device according to claim 2, wherein the content selecting unit selects content associated with a commodity corresponding to the commodity information indicated by the operation information corresponding to the second attribute information of the detected person when the person has been detected in an area in which a commodity in which the detected person is interested is displayed, and
wherein the display control unit displays the selected content on the display device provided at a position corresponding to the area in which the person has been detected.

4. The display control device according to claim 2, wherein the storage unit stores the acquired first attribute information, the acquired operation information, and a time at which the first attribute information and the operation information have been acquired in correlation, and
wherein the content selecting unit selects the content on the basis of the operation information acquired at a time proximate to the time at which the person has been detected.

5. The display control device according to claim 2, wherein the storage unit additionally stores count information obtained by counting the number of displays of the commodity information on the operation terminal by the operation of the person for each of the person's attributes, and
wherein the content selecting unit selects the content on the basis of the second attribute information of the person detected in an area in which the commodity is displayed and the count information.

6. The display control device according to claim 5, wherein the content selecting unit selects content relevant for the attributes of the detected person on the basis of the count information when the person has been detected in an area in which the commodity in which the detected person is interested is not displayed, and
wherein the display control unit displays the selected content on the display device provided at a position corresponding to the area in which the person has been detected.

7. The display control device according to claim 5, wherein the content selecting unit identifies commodity information with a largest number of displays in the attributes of the detected person from the count information and selects content associated with a commodity corresponding to the identified commodity information.

8. The display control device according to claim 5, wherein the storage unit additionally stores time-specific information obtained by counting the number of store-visited persons having visited a store in the past for each attribute for each time period, and
wherein the content selecting unit selects the content on the basis of the time-specific information and the count information.

9. A display control device comprising:
an attribute information acquiring unit configured to acquire first attribute information indicating attributes of a person who is operating an operation terminal displaying commodity information in response to an operation on the basis of a first image obtained by imaging the person using a first imaging device provided in the operation terminal and to acquire second attribute information indicating person's attributes included in a second image captured by a second imaging device provided in a display device different from the operation terminal on the basis of the second image;
an operation information acquiring unit configured to acquire operation information indicating the commodity information displayed on the operation terminal from the operation terminal;
a content selecting unit configured to select content on the basis of the acquired first attribute information, the acquired second attribute information, and the acquired operation information;
a display control unit configured to display the selected content on the display device; and
a storage unit configured to store the acquired first attribute information and the acquired operation information in correlation,
wherein the content selecting unit acquires operation information corresponding to the second attribute information of the person detected in an area in which commodities are displayed from the storage unit and selects the content on the basis of the acquired operation information, wherein the storage unit additionally stores count information obtained by counting the number of displays of the commodity information on the operation terminal by the operation by the person for each attribute of the person, and wherein the content selecting unit selects the content on the basis of the second attribute information of the person detected in an area in which the commodity is displayed and the count information, wherein the storage unit additionally stores time-specific information obtained by counting the number of store-visited persons having visited a store in the past for each attribute for each time period, and wherein the content selecting unit selects the content on the basis of the time-specific information and the count information, wherein the content selecting unit selects content appropriate for a current time period on the basis of the time-specific information and the count information when the person who has operated the operation terminal to display the commodity information has not been detected, and wherein the display control unit displays the selected content on the display device.

10. The display control device according to claim 9, wherein the content selecting unit identifies person's attributes with the largest number of visits in a current time period from the time-specific information, identifies commodity information with the largest number of displays in the identified attributes from the count information, and selects content associated with a commodity corresponding to the identified commodity information.

11. The display control device according to claim 9, further comprising an identification unit configured to identify the customer person included in the second image captured by the second imaging device which is provided such that the customer person near the display device is able to be imaged out of the operating person who has operated the operation terminal to display the commodity information, wherein the operation information acquiring unit acquires the operation information of the identified operating person.

12. The display control device according to claim 11, wherein the identification unit identifies the operating person on the basis of whether attributes of a person included in the first image captured by the first imaging device and attributes of the customer person included in the second image captured by the second imaging device match.

13. The display control device according to claim 9, wherein the content selecting unit selects the content by considering that the first attribute information acquired from the first image captured by the first imaging device provided in the operation terminal is of a higher priority than the second attribute information acquired from the second image captured by the second imaging device.

14. The display control device according to claim 9, wherein the content selecting unit selects content according to the current time period on the basis of the time-specific information and the count information when the person who has operated the operation terminal to display the commodity information has not been detected.

* * * * *